Figure 1:
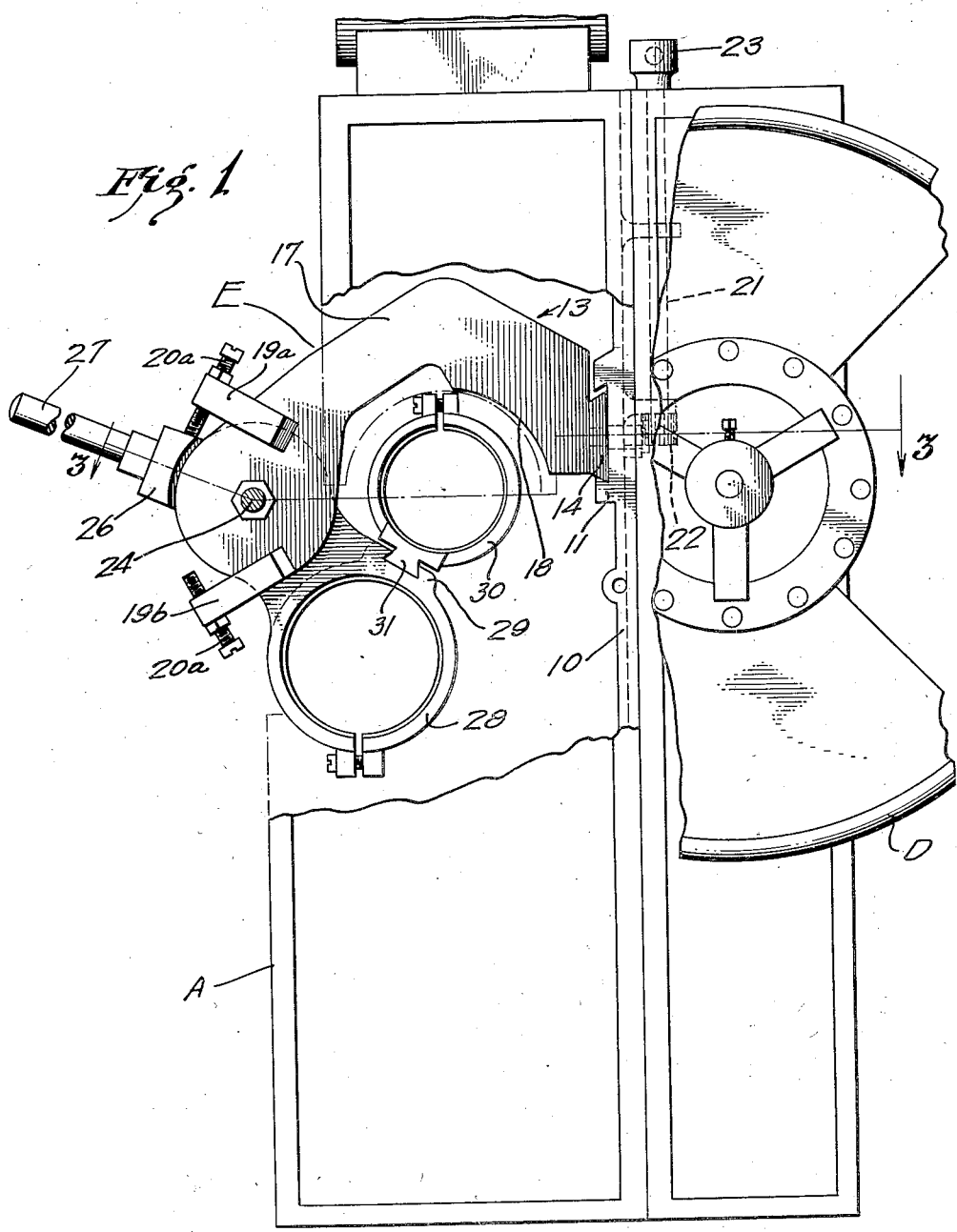

Sept. 8, 1931. A. TONDREAU 1,822,551

LENS SHIFTING MECHANISM FOR PROJECTING MACHINES

Filed April 13, 1929 3 Sheets-Sheet 1

INVENTOR.
Albert Tondreau
BY Nestall and Wallen
ATTORNEYS.

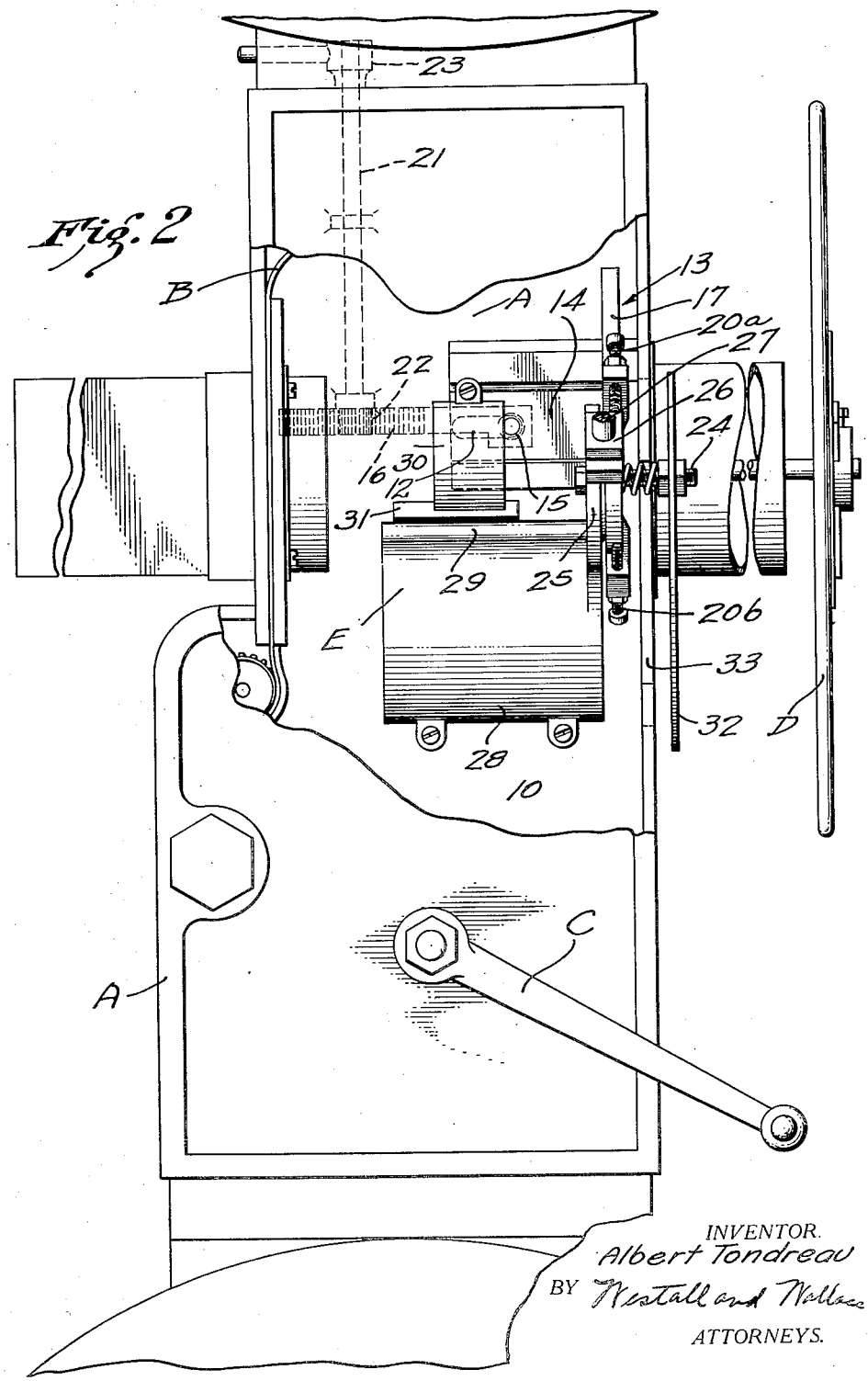

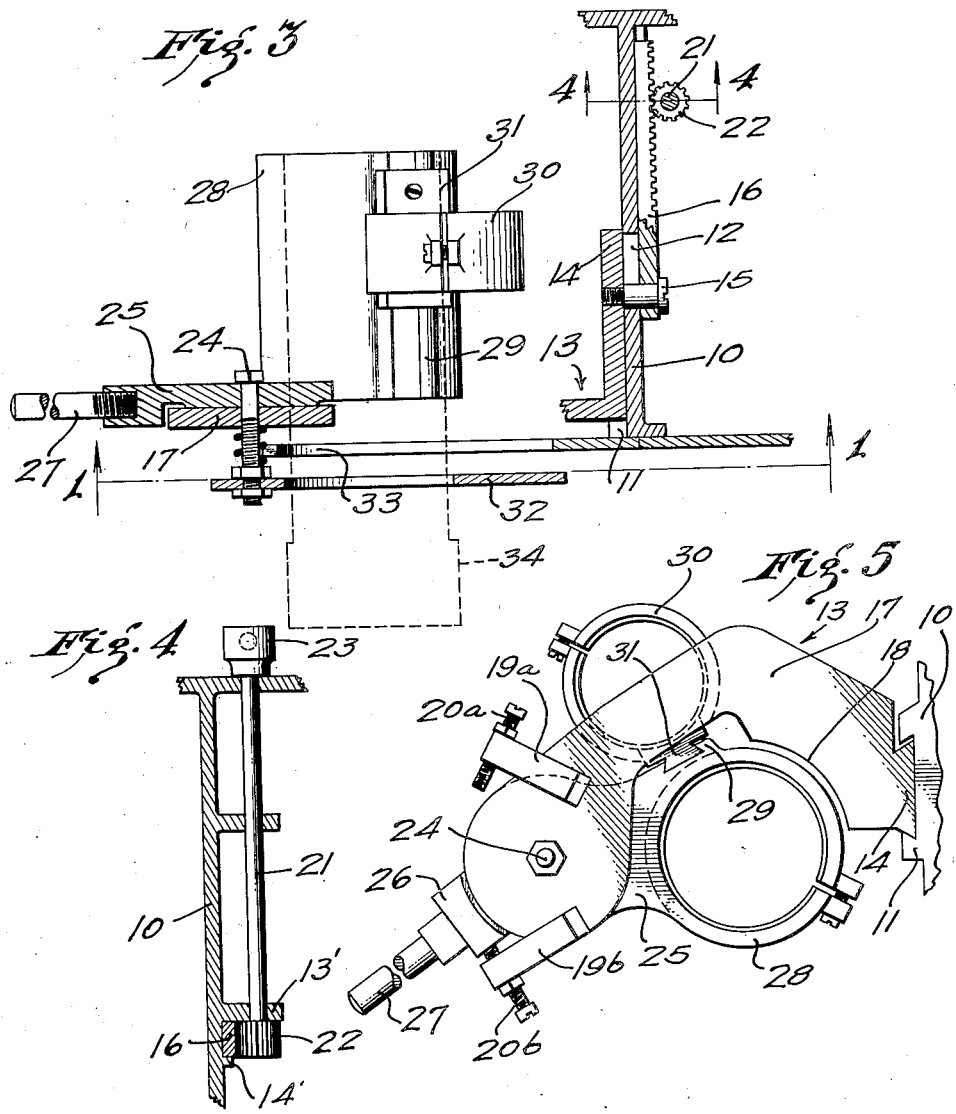

Patented Sept. 8, 1931

1,822,551

UNITED STATES PATENT OFFICE

ALBERT TONDREAU, OF LOS ANGELES, CALIFORNIA, ASSIGNOR TO WARNER BROS. PICTURES, INC., OF LOS ANGELES, CALIFORNIA, A CORPORATION

LENS SHIFTING MECHANISM FOR PROJECTING MACHINES

Application filed April 13, 1929. Serial No. 354,810.

This invention relates to picture projecting apparatus and pertains more especially to mechanism for shifting lenses to enable an instant change of magnification on the projection screen without loss of focus. The invention is especially useful to permit changes to be made from a small screen to a large screen or vice versa. Such effects are desirable in many instances for effects upon the spectators well known in motion picture projecting art.

The present invention has for its primary object the provision of an attachment carrying lenses which may be first set in focus, and which may be operated to instantly bring either one lens of a certain magnification or another of another magnification as selected into optical operation.

In addition to the broader objects of this invention, there are certain details of structure which make the attachment adaptable to standard projection machines and which provides an easily manipulated, simple, compact structure.

These objects together with other objects and corresponding accomplishments are obtained by means of the embodiment of my invention illustrated in the accompanying drawings, in which:—

Fig. 1 is a front plan view of the projection machine head with parts broken away to better show the apparatus embodying the inventive features; Fig. 2 is a side view with parts broken away to expose the parts embodying the invention; Fig. 3 is a section as seen on the line 3—3 of Fig. 1; Fig. 4 is a section as seen on the line 4—4 of Fig. 3; and Fig. 5 is a front view showing the attachment with the lenses in a different position from that shown in Fig. 1.

Referring more particularly to the drawings, a motion head frame is indicated by A. This head may be of a well known type slightly altered and may be standard except that a riser block is mounted at the top following the same design as the present head and using the same gears, sprockets, levers and shafts, elevating them to prevent the lens attachment from striking the sprockets in operation. The riser block is an extension head and necessitates an extension front plate. However, this forms no part of the present invention and the motion head is shown as if originally constructed to accommodate the lens attachment forming the present invention. A film marked B is intermittently advanced by suitable mechanism as is well known in the art and a handle C is provided for operation. A disk shutter D is shown herein. The attachment indicated generally by E replaces the usual objective lens mounting. The frame 10 of the head is thickened to form a mortise rib 11 serving as a rail for the lens bracket to ride therein. A slot 12 is provided in the frame, and on the side of the frame 10 opposite to the rib are ledges to accommodate and guide a rack. Such mortise ribs and slots are commonly provided in a certain standard motion head.

Mounted in the mortise is a lens bracket 13 having a tenon 14 disposed in the mortise so as to be slidable therein. Attached to the tenon is a pin 15 disposed in slot 12 and attached to a rack 16 disposed on the opposite face of wall 10 between ledges. The bracket is provided with an arm 17 having a cut-away portion 18 to accommodate a lens. Stop lugs 19a and 19b are provided and have mounted therein stop pins 20a and 20b. Mounted in suitable bearings on the rear of frame 10 is a shaft 21 having a pinion 22 at its lower end and a knob 23 at its upper end. The pinion meshes with the teeth on rack 16 so that upon turning knob 23, the bracket may be advanced and retracted.

At the end of arm 17 is a pivot pin 24, upon which is mounted the base of a lens carrier. The base of the carrier comprises a plate 25 having a stop extension 26 adapted to be engaged with either stop pin 20a or stop pin 20b. A shift handle 27 is attached to the base and serves for swinging the lens carrier. Formed upon the base 25 is a cylindrical shell 28 to hold a lens which may be mounted therein. There is a rib 29 extending longitudinally of the shell and having a mortise. Mounted on the shell 28 is a lens shell 30 having a tenon extension 31 mounted in mortise 29. The lens shells and base constitute a lens shifter arranged so that by swinging the shifter, either the lens in shell 28 or shell 30 may be placed in alinement with the projected rays of light. A follower shield plate 32 is provided and attached to shifter to swing therewith and cover the opening 33 in the head so as to prevent light leakage. The lens 34 indicated by dotted lines in Fig. 3 acts as a guide to cause the plate to swing with the shifter, it fitting closely in a corresponding opening in the follower plate.

In operation, lenses are mounted in the shells 28 and 30, these lenses being of different sizes and therefore having different magnifications. They are arranged in position with respect to one another so that when knob 23 is operated to bring one of the lenses into focus upon the screen, the other lens will also be in focus when the shifter is swung to change position of the lenses. Obviously, when it is desired to change from a large screen to a small screen or by vice versa, the handle 27 may be swung to bring the selected lens into operative position. The action is substantially instantaneous and refocusing is not required.

What I claim is:—

1. A picture projection apparatus comprising a motion head having a front plate with a light opening for passage of projected light and a side wall, a mortise track on said side wall extending parallel to the projected light rays; an objective lens shifter device comprising a bracket having a tenon mounted in said groove, a rack secured to said bracket, a shaft, a pinion on said shaft engaging said rack whereby to adjustably position said bracket frame along the length of said track, a lens shifter including a first lens shell, a second lens shell, a mortise and tenon connection between said shells to enable adjustment of said shells longitudinally of one another, a pivotal connection between said shifter and said bracket to enable said shells to be swung to position either lens shell with its axis in alinement with the projected light, a lens shifter handle secured to said carrier, stops to limit swinging movement of said shifter, and a follower shield plate secured to said carrier with light apertures in alinement with said lens shells.

2. A picture projection apparatus comprising a motion head having a front plate with a light opening for passage of projected light and a side wall, a track on said side wall extending parallel to the projected light rays; a lens shifter device comprising a bracket, means to adjustably position said bracket along the length of said track, a lens shifter including a first lens shell, a second lens shell secured to said first lens shell so as to be movable therealong and enable longitudinal adjustment in relation to one another, a pivotal connection between said shifter and said bracket to enable said shells to be swung to position either lens shell with its axis in alinement with the projected light, a lens shifter handle secured to said shifter, stops to limit swinging movement of said shifter, and a follower shield plate secured to said shifter with light apertures in alinement with said lens shells.

3. A picture projection apparatus comprising a motion head having a front plate with a light opening for passage of projected light and a side wall, a mortise track on said side wall extending parallel to the projected light rays; a lens shifter device comprising a bracket having a tenon mounted in said groove for adjustable positioning said bracket along the length of said track, a lens shifter including a first lens shell, a second lens shell secured to said first lens shell to enable longitudinal adjustment of said shells in relation to one another, a pivotal connection between said shifter and said bracket to enable said shells to be swung to position either lens shell with its axis in alinement with the projected light, and a follower shield plate secured to said shifter with light apertures in alinement with said lens shells.

4. A picture projection apparatus comprising a motion head having a front plate with a light opening for passage of projected light and a side wall, a mortise track on said side wall extending parallel to the projected light rays; a lens shifter device comprising a bracket, means to adjustably position said bracket along the length of said track, a lens shifter including a first lens shell, a second lens shell secured to said first lens shell to be moved therealong so as to enable longitudinal adjustment of said shells in relation to one another, a pivotal connection between said shifter and said bracket to enable said shells to be swung to position either lens shell with its axis in alinement with the projected light, and a follower shield plate secured to said shifter with light apertures in alinement with said lens shells.

5. A picture projection apparatus comprising a motion head having a front plate with a light opening for passage of projected light and a side wall, a mortise track on said side wall extending parallel to the projected light rays; a lens shifter device comprising a bracket having a tenon mounted in said groove, a rack for said bracket, a shaft, a pinion on said shaft engaging said rack whereby to adjustably position said bracket along the length of said track, a lens shifter including a first lens shell, a second lens shell, a mortise and tenon connection between said shells to enable longitudinal adjustment of said shells in relation to one another, a pivotal connection between said shifter and said bracket to enable said shells to be swung to position either lens shell with its axis in alinement with the projected light, a lens shifter handle secured to said shifter, and stops to limit swinging movement of said carrier.

6. A picture projection apparatus comprising a motion head having a front plate with a light opening for passage of projected light and a side wall, a track on said side wall extending parallel to the projected light rays; a lens shifter device comprising a bracket having a tenon mounted in said groove, means to adjustably position said bracket along the length of said track, a lens shifter including a first lens shell, a second lens shell secured to said first lens shell to be moved therealong so as to enable longitudinal adjustment of said shells in relation to one another, a pivotal connection between said shifter and said bracket to enable said shells to be swung to position either lens shell with its axis in alinement with the projected light, a lens shifter handle secured to said shifter.

7. A picture projection apparatus comprising a motion head having a front plate with a light opening for passage of projected light and a side wall, a mortise track on said side wall extending parallel to the projected light rays; a lens shifter comprising a bracket having a tenon mounted in said groove, means to adjustably position said bracket along the length of said track, a lens shifter including a first lens shell, a second lens shell secured to said first lens shell so as to be moved therealong to enable longitudinal adjustment of said shells in relation to one another, a pivotal connection between said shifter and said bracket to enable said shells to be swung to position either lens shell with its axis in alinement with the projected light, and a lens shifter handle secured to said shifter.

8. A picture projection apparatus comprising a motion head, a lens shifter device comprising a bracket secured to said head, a lens shifter including a first lens shell, a second lens shell, a mortise and tenon connection between said shells to enable longitudinal adjustment of said shells in relation to one another, a pivotal connection between said shifter and said bracket to enable said shells to be swung to position either lens shell with its axis in alinement with the projected light, a lens shifter handle secured to said shifter, and stops to limit swinging movement of said shifter.

9. A picture projection apparatus comprising a motion head, a lens shifter device comprising a bracket secured to said head, a lens shifter including a first lens shell, a second lens shell having its axis spaced from and parallel to said first lens shell and secured thereto so as to be moved therealong and enable longitudinal adjustment of said shells in relation to one another, a pivotal connection between said shifter and said bracket to enable said shells to be swung to position either lens shell with its axis in alinement with the projected light, a lens shifter handle secured to said shifter and stops to define the limits of swinging movement of said shifter.

In witness that I claim the foregoing I have hereunto subscribed my name this 28th day of February, 1929.

ALBERT TONDREAU.